UNITED STATES PATENT OFFICE.

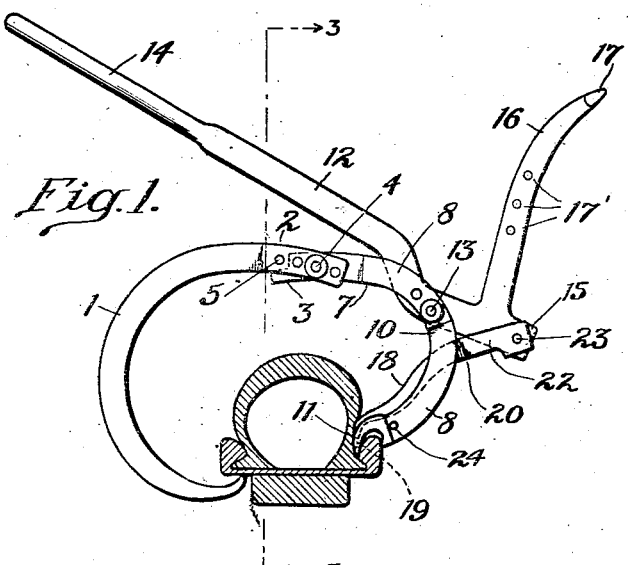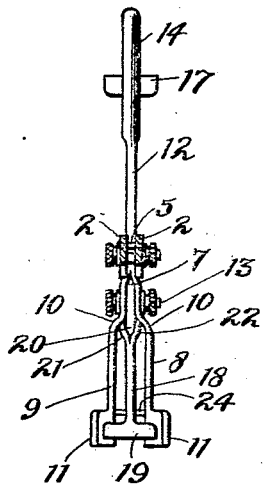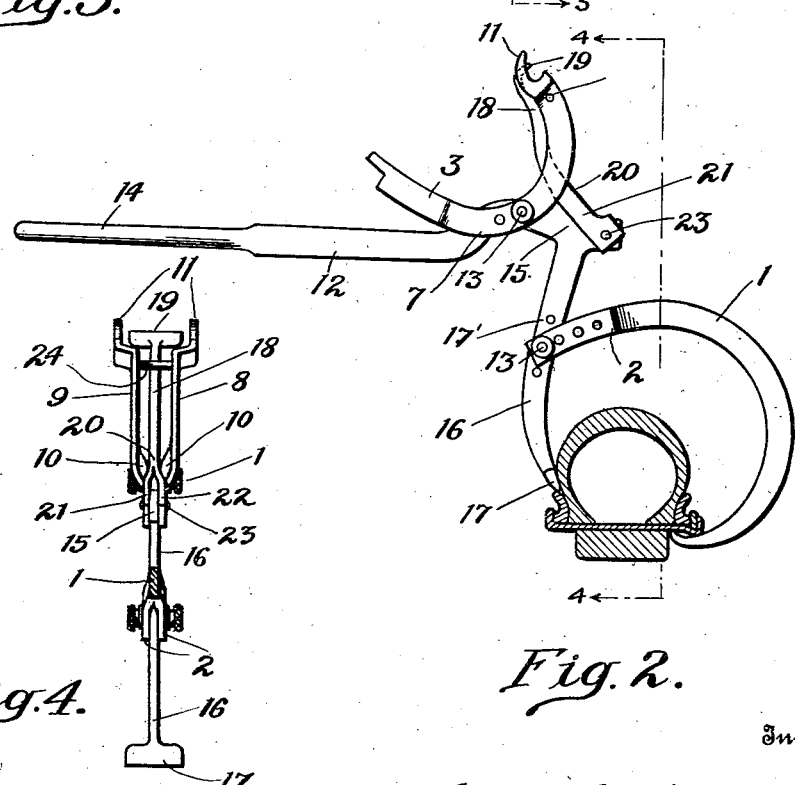

AMOS C. HARTMAN, OF DILLSBURG, PENNSYLVANIA.

TIRE-REMOVER.

1,220,107. Specification of Letters Patent. Patented Mar. 20, 1917.

Application filed March 29, 1916. Serial No. 87,619.

*To all whom it may concern:*

Be it known that I, AMOS C. HARTMAN, a citizen of the United States, residing at Dillsburg, in the county of York and State of Pennsylvania, have invented certain new and useful Improvements in Tire-Removers, of which the following is a specification.

This invention relates to tools and more particularly to that class of tools known as wheelwright tools and has for its object to produce a device of this character that will remove pneumatic tires from vehicle wheels.

Another object of this invention is to produce a device that will by a simple leverage movement remove a tire from any style of wheel rim and also release the lock ring used on some demountable rims.

A further object is to provide a device of the character described that will be adjustable and so made to fit any size rim or tire.

Other objects and advantages such as simplicity, durability, cheapness in manufacture, and the general improvement of the art will be fully brought out in the following specification and illustrated in the accompanying drawings in which:

Figure 1 is a view showing my device in position to remove a tire from a rim not employing a lock ring, Fig. 2 is a view showing my improved device in position to loosen a tire on a rim employing a lock ring, Fig. 3 is a view on the line 3—3 of Fig. 1 and Fig. 4 is a view on the line 4—4 of Fig. 2.

Referring more particularly to the drawings the numeral 1 designates a securing member of the device which is adapted to engage the underside of a wheel rim. The member 1 is curved so as to bridge over the tire and is split at 2 and pivotally secured to a second securing member 3 by a pivot 4. A stop 5 is secured in the split portion of the member 1 to prevent the end of the member 3 from extending above the member 1 and causing a buckle joint.

The member 3 comprises a single portion 6 split at 7 forming portions 8 and 9. The portions 8 and 9 being bulged outwardly at 10 thereby widening the space between them for a purpose to be described. The lower end of the portions 8 and 9 are bent outwardly at right angles then inwardly and terminate in hooks 11 for a purpose to be described.

A lever member 12 is secured between the bulged portions of the members 8 and 9 by a pivot 13 and comprises a handle 14 and an extension 15 below the pivot 13. A member 16 for a purpose to be described is formed integral with the extension 15 and extends outwardly therefrom and has a blunted end 17, and a plurality of pivot holes 17' formed therein.

A member 18 similar in shape to the member 16 and having a blunted point 19 is split at 20 and spaced apart forming portions 21 and 22 secured to the extension 13 below the member 16 by a pivot 23. The member 18 is kept from falling below the portions 8 and 9 of the member 3 by a lock bar 24.

It will of course be understood that I provide a plurality of holes adjacent the pivots 4 and 13 to provide for adjustment.

In the description of the operation of the device the term rear is applied to the inner side of the wheel and tire and the term front to the out side of the tire and wheel.

The operation of the device is as follows: To remove a pneumatic tire from any rims other than the class employing lock rings the device is assembled as shown in Fig. 1 and the member 1 is hooked under the front edge of the rim and the hooks 11 formed on the portions 8 and 9 of the member 3 are hooked over the rear edge of the rim. The member 18 is then in position against the inside edge of the tire and by pushing against the handle 14 the tire is unseated from the rim.

To remove a tire from a rim employing a lock ring the member 1 is removed from the member 3 and pivoted to the member 16 as shown in Fig. 2. The member 1 is then hooked under the rear edge of the rim, and the member 16 is placed against the front side of the tire and pressure applied to the handle 14 thus loosening the tire. The member 16 is then placed against the lock ring and pressure applied to the handle 14. This operation loosens the lock ring and it may then be removed and the tire will then be loose and can be easily removed, but if from any cause it should stick the operation first described above may be used and the tire forced from its rim.

Having thus described my invention what I claim is:

A tire remover comprising a curved rim engaging member adapted to be engaged under the front edge of a wheel rim, a second curved rim engaging member pivoted to said first mentioned member and having its free end terminating in a hook adapted to fit over the rear flange of a wheel rim, a lever pivoted to said last mentioned member, and a tire engaging member pivoted to said lever.

In testimony whereof I affix my signature.

AMOS C. HARTMAN.